(12) United States Patent
Hardee

(10) Patent No.: US 7,258,778 B2
(45) Date of Patent: Aug. 21, 2007

(54) ELECTROCATALYTIC COATING WITH LOWER PLATINUM GROUP METALS AND ELECTRODE MADE THEREFROM

(75) Inventor: Kenneth L. Hardee, Middlefield, OH (US)

(73) Assignee: Eltech Systems Corporation, Chardon, OH (US)

( * ) Notice: Subject to any disclaimer, the term of this patent is extended or adjusted under 35 U.S.C. 154(b) by 225 days.

(21) Appl. No.: 10/395,939

(22) Filed: Mar. 24, 2003

(65) Prior Publication Data

US 2004/0188247 A1 Sep. 30, 2004

(51) Int. Cl.
*C25B 1/46* (2006.01)
*C25B 11/08* (2006.01)

(52) U.S. Cl. ............ 205/532; 204/290.01; 204/290.12; 204/290.13; 204/290.14

(58) Field of Classification Search .......... 204/290.01, 204/290.12, 290.13, 290.14, 291, 252, 290.09, 204/290.08; 205/500, 501, 516, 526, 532, 205/535, 292; 427/255.19, 255.21, 307
See application file for complete search history.

(56) References Cited

U.S. PATENT DOCUMENTS

| | | | |
|---|---|---|---|
| 3,711,385 A | 1/1973 | Beer et al. | |
| 3,773,555 A * | 11/1973 | Cotton et al. | 205/200 |
| 3,775,284 A | 11/1973 | Bennett et al. | |
| 3,776,834 A | 12/1973 | O'Leary | |
| 3,853,739 A * | 12/1974 | Kolb et al. | 204/290.09 |
| 3,875,043 A | 4/1975 | Franks et al. | |
| 4,070,504 A | 1/1978 | Bianchi et al. | |
| 4,120,568 A * | 10/1978 | Deb et al. | 359/274 |
| 4,153,742 A | 5/1979 | Böehn et al. | |
| 4,213,843 A | 7/1980 | Sato et al. | |
| 4,223,049 A | 9/1980 | Murray et al. | |
| 4,384,941 A * | 5/1983 | Okamoto et al. | 205/628 |
| 4,411,762 A * | 10/1983 | Kline | 205/96 |
| 4,446,245 A | 5/1984 | Hinden | |
| 4,468,416 A | 8/1984 | Asano et al. | |
| 4,471,006 A | 9/1984 | Asano et al. | |
| 4,477,316 A | 10/1984 | Sakai et al. | |
| 4,495,046 A | 1/1985 | Switzer | |
| 4,545,886 A * | 10/1985 | de Nora et al. | 204/252 |
| 5,314,601 A * | 5/1994 | Hardee et al. | 204/290.03 |
| 5,587,058 A | 12/1996 | Gorodetsky | |
| 6,071,570 A * | 6/2000 | Hardee et al. | 205/67 |
| 6,200,457 B1 | 3/2001 | Durand et al. | |
| 6,368,489 B1 * | 4/2002 | Hardee et al. | 205/578 |
| 6,527,939 B1 * | 3/2003 | Hardee | 205/292 |
| 6,802,948 B2 * | 10/2004 | Hardee et al. | 204/290.14 |

* cited by examiner

*Primary Examiner*—Harry D Wilkins, III
(74) *Attorney, Agent, or Firm*—Eschweiler & Associates, LLC

(57) ABSTRACT

The present invention relates to an electrocatalytic coating and an electrode having the coating thereon, wherein the coating is a mixed metal oxide coating, preferably platinum group metal oxides, with or without low levels of valve metal oxides. The electrocatalytic coating can be used especially as an anode component of an electrolysis cell and in particular a cell for the electrolysis of aqueous chlor-alkali solutions.

39 Claims, No Drawings

ELECTROCATALYTIC COATING WITH LOWER PLATINUM GROUP METALS AND ELECTRODE MADE THEREFROM

BACKGROUND OF THE INVENTION

1. Field of the Invention

The invention is directed to an electrolytic electrode and a coating thereon having decreased amounts of platinum group metals with little or no valve metal for use in the electrolysis of aqueous chlor-alkali solutions.

2. Description of the Related Art

Lifetimes of electrodes, composed essentially of an active coating on a substrate, are a function of both the amount of active material applied to the substrate and the current density. Decreasing the amount of coating or increasing the current density results in a more rapid failure of the electrode. In general, an early failure of an electrode is attributed to two major factors, loss of the active coating and dissolution, or in case of the film-forming metals, passivation of the substrate. Sometimes these occur simultaneously and the electrode at the end of its lifetime may show some active material left in the coating, but the substrate has passivated.

Heretofore, a common solution to the problem of loss of the active component in the coating and passivation of the substrate was use of thicker coatings, i.e., higher loadings of the active component. Thicker coatings produced by the application onto the substrate of several e.g. ten-twenty or more layers of the active coating proved beneficial for lifetimes of the electrodes with the same coating composition. Simplicity of the solution to the problem of electrode lifetimes made thicker coatings a popular and almost universal remedy. However, an increase of the coating thickness meant a significant increase in cost due to the increased amount of platinum group metal utilized in the coating, as well as increased labor costs due to the higher number of layers applied.

Many attempts have been made to economize on the precious metal content of these coatings, usually, by partly replacing the platinum-group metal oxide with a compatible non-precious metal oxide such as tin dioxide (see, for example, U.S. Pat. No. 3,776,834) or tin and antimony oxides (see, for example, U.S. Pat. No. 3,875,043).

Additionally, the use of valve metal oxides in combination with the precious metal coating has been attempted. Such an anode for use in electrolytic processes such as chlorine production is disclosed in U.S. Pat. No. 4,070,504. The electrode utilizes a titanium or tantalum metal substrate with a coating of mixed metal oxides, preferably valve metal oxides and platinum group metal oxides which have been doped with a doping oxide. The valve metal oxide is present in the coating in an amount of greater than 25 mole percent.

The problem of electrode lifetime is also important with oxygen evolving electrodes used as anodes in various industrially important electrochemical processes, e.g., low current density oxygen evolving processes. In these processes, electrodes with platinum-group metal oxide coatings are used as oxygen evolving anodes. These platinum-group metal oxide anodes are found to operate very well under relatively difficult conditions imposed by these processes (e.g. current densities of up to 2-3 $kA/m^2$ in aggressive electrolytes). However, to attain an acceptable performance under these conditions, these electrodes must have relatively high platinum-group metal loadings (e.g. more than about 12-16 $g/m^2$). Various tests with the known oxygen evolving anodes have shown, however, that while electrodes with platinum-group metal oxides operate with satisfaction under these conditions, they fail rapidly if the operating current density is increased to 5 $kA/m^2$ or more. The simple approach of a higher loading, therefore, meant only higher costs but not better service life. In recent years, the rapid development of high speed plating (electrogalvanizing) techniques has amplified the problem.

It has been known from U.S. Pat. No. 3,711,385 that the electrocatalytic coating of a platinum-group metal oxide could be made as thin as 0.054 micrometers. In practice, however, it has been found that to achieve any acceptable lifetime somewhat thicker coatings were necessary. Hence, usually ten to twenty thin coatings of a suitable paint solution are applied to the film-forming metal base and heated each time to give an electrocatalytic coating formed from the decomposed component of the paint containing about 5 to 20 grams by metal of the platinum-group metal oxide per square meter of the projected electrode surface.

An oxygen evolving anode made by coating a titanium substrate with iridium oxide or iridium/ruthenium oxide using a mixture of codeposited titanium oxide or tin oxide and tantalum oxide or niobium oxide with platinum metal as the electrode underlayer has been disclosed in U.S. Pat. No. 4,481,097. The electrode active component includes 1.3 $g/m^2$ of platinum metal in the underlayer and 3.0 $g/m^2$ of iridium oxide in the top layer. According to the document, the electrode has maximum lifetime of 80 hours under accelerated lifetime tests performed in an aqueous solution with 150 g/l of $H_2SO_4$ as an electrolyte at 80° C. and current density of 25 $kA/m^2$.

It would, however, be desirable to provide an electrode for such service having improved lifetimes without this being offset by a prohibitive cost due either to a high cost of the electrode materials or a high production cost or a combination of these.

SUMMARY OF THE INVENTION

There has now been found an electrode coating which provides improved lifetimes while maintaining high efficiencies. The coating further allows reduced usage of precious metals and thus is more cost effective. The electrode is especially beneficial in electrochemical cells wherein the oxidation of chloride to chlorine is the principal anode reaction.

DESCRIPTION OF THE INVENTION

The electrode base may be a sheet of any film-forming metal such as titanium, tantalum, zirconium, niobium, tungsten and silicon, and alloys containing one or more of these metals, with titanium being preferred for cost reasons. By "film-forming metal" it is meant a metal or alloy which has the property that when connected as an anode in the electrolyte in which the coated anode is subsequently to operate, there rapidly forms a passivating oxide film which protects the underlying metal from corrosion by electrolyte, i.e., those metals and alloys which are frequently referred to as "valve metals", as well as alloys containing valve metal (e.g., Ti—Ni, Ti—Co, Ti—Fe and Ti—Cu), but which in the same conditions form a non-passivating anodic surface oxide film. Plates, rods, tubes, wires or knitted wires and expanded meshes of titanium or other film-forming metals can be used as the electrode base. Titanium or other film-forming metal clad on a conducting core can also be used. It is also possible to surface treat porous sintered titanium with dilute paint solutions in the same manner.

It is also contemplated that a separated electrolytic cell having a separator therein may be used in the process. The electrolytic cell may be separated by a membrane separator or a porous separator, such as a diaphragm, as is known to those skilled in the art.

For most applications, the base will be roughened by means of etching or grit blasting, or combinations thereof, but in some instances the base can simply be cleaned, and this gives a very smooth electrode surface. Alternatively, the film-forming metal substrate can have a pre-applied surface film of film-forming metal oxide which, during application of the active coating, can be attacked by an agent in the coating solution (e.g. HCl) and reconstituted as a part of the integral surface film.

The electrolytic process of the present invention is particularly useful in the chlor-alkali industry for the production of chlorine. The electrode described herein when used in such process will virtually always find service as an anode. Thus, the word "anode" is often used herein when referring to the electrode, but this is simply for convenience and should not be construed as limiting the invention.

The metals for the electrode are broadly contemplated to be any coatable metal. For the particular application of an electrocatalytic coating, the metal might be such as nickel or manganese, but will most always be valve metals, including titanium, tantalum, aluminum, zirconium and niobium. Of particular interest for its ruggedness, corrosion resistance and availability is titanium. As well as the normally available elemental metals themselves, the suitable metals of the substrate include metal alloys and intermetallic mixtures, as well as ceramics and cermets such as contain one or more valve metals. For example, titanium may be alloyed with nickel, cobalt, iron, manganese or copper. More specifically, grade 5 titanium may include up to 6.75 weight percent aluminum and 4.5 weight percent vanadium, grade 6 up to 6 percent aluminum and 3 percent tin, grade 7 up to 0.25 weight percent palladium, grade 10, from 10 to 13 weight percent plus 4.5 to 7.5 weight percent zirconium and so on.

By use of elemental metals, it is most particularly meant the metals in their normally available condition, i.e., having minor amounts of impurities. Thus, for the metal of particular interest, i.e., titanium, various grades of the metal are available including those in which other constituents may be alloys or alloys plus impurities. Grades of titanium have been more specifically set forth in the standard specifications for titanium detailed in ASTM B 265-79. Because it is a metal of particular interest, titanium will often be referred to herein for convenience when referring to metal for the electrode base.

Regardless of the metal selected and the form of the electrode base, before applying a coating composition thereto, the electrode base is advantageously a cleaned surface. This may be obtained by any of the treatments used to achieve a clean metal surface, including mechanical cleaning. The usual cleaning procedures of degreasing, either chemical or electrolytic, or other chemical cleaning operation may also be used to advantage. Where the base preparation includes annealing, and the metal is grade 1 titanium, the titanium can be annealed at a temperature of at least about 450° C. for a time of at least about 15 minutes, but most often a more elevated annealing temperature, e.g., 600° C. to 875° C. is advantageous.

When a clean surface, or prepared and cleaned surface, has been obtained, it may be advantageous to obtain a surface roughness. This will be achieved by means which include intergranular etching of the metal, plasma spray application, which spray application can be of particulate valve metal or of ceramic oxide particles, or both, and sharp grit blasting of the metal surface, optionally followed by surface treatment to remove embedded grit and/or clean the surface.

Etching will be with a sufficiently active etch solution to develop a surface roughness and/or surface morphology, including possible aggressive grain boundary attack. Typical etch solutions are acid solutions. These can be provided by hydrochloric, sulfuric, perchloric, nitric, oxalic, tartaric, and phosphoric acids as well as mixtures thereof, e.g., aqua regia. Other etchants that may be utilized include caustic etchants such as a solution of potassium hydroxide/hydrogen peroxide, or a melt of potassium hydroxide with potassium nitrate. Following etching, the etched metal surface can then be subjected to rinsing and drying steps. The suitable preparation of the surface by etching has been more fully discussed in U.S. Pat. No. 5,167,788, which patent is incorporated herein by reference.

In plasma spraying for a suitably roughened metal surface, the material will be applied in particulate form such as droplets of molten metal. In this plasma spraying, such as it would apply to spraying of a metal, the metal is melted and sprayed in a plasma stream generated by heating with an electric arc to high temperatures in inert gas, such as argon or nitrogen, optionally containing a minor amount of hydrogen. It is to be understood by the use herein of the term "plasma spraying" that although plasma spraying is preferred the term is meant to include generally thermal spraying such as magnetohydrodynamic spraying, flame spraying and arc spraying, so that the spraying may simply be referred to as "melt spraying" or "thermal spraying".

The particulate material employed may be a valve metal or oxides thereof, e.g., titanium oxide, tantalum oxide and niobium oxide. It is also contemplated to melt spray titanates, spinels, magnetite, tin oxide, lead oxide, manganese oxide and perovskites. It is also contemplated that the oxide being sprayed can be doped with various additives including dopants in ion form such as of niobium or tin or indium.

It is also contemplated that such plasma spray application may be used in combination with etching of the substrate metal surface. Or the electrode base may be first prepared by grit blasting, as discussed hereinabove, which may or may not be followed by etching.

It has also been found that a suitably roughened metal surface can be obtained by special grit blasting with sharp grit, optionally followed by removal of surface embedded grit. The grit, which will usually contain angular particles, will cut the metal surface as opposed to peening the surface. Serviceable grit for such purpose can include sand, aluminum oxide, steel and silicon carbide. Etching, or other treatment such as water blasting, following grit blasting can be used to remove embedded grit and/or clean the surface.

It will be understood from the foregoing that the surface may then proceed through various operations, providing a pretreatment before coating, e.g., the above-described plasma spraying of a valve metal oxide coating. Other pretreatments may also be useful. For example, it is contemplated that the surface be subjected to a hydriding or nitriding treatment. Prior to coating with an electrochemically active material, it has been proposed to provide an oxide layer by heating the substrate in air or by anodic oxidation of the substrate as described in U.S. Pat. No. 3,234,110. Various proposals have also been made in which an outer layer of electrochemically active material is deposited on a sublayer, which primarily serves as a protective and conductive intermediate. Various tin oxide based underlayers are disclosed in U.S. Pat. Nos. 4,272,354, 3,882,002 and 3,950,240. It is also contemplated that the surface may be prepared as with an antipassivation layer.

Following surface preparation, which might include providing a pretreatment layer such as described above, an electrochemically active coating layer may then be applied to the substrate member. As is typically representative of the electrochemically active coatings that are often applied, are those provided from active oxide coatings such as platinum group metal oxides, magnetite, ferrite, cobalt spinel or mixed metal oxide coatings. They may be water based, such as aqueous solutions, or solvent based, e.g., using alcohol solvent. However, it has been found that for the process of the present invention, the preferred coating composition solutions are typically those consisting of $RuCl_3$ and $IrCl_3$ and hydrochloric acid, all in alcohol solution, with or without the presence of a valve metal component. It is also contemplated to utilize chloriridic acid, $H_2IrCl_6$. It will be understood that the $RuCl_3$ may be utilized in a form such as $RuCl_3$ $xH_2O$ and $IrCl_3$ $xH_2O$ can be similarly utilized. For convenience, such forms will generally be referred to herein simply as $RuCl_3$ and $IrCl_3$. Generally, the ruthenium chloride will be dissolved along with the iridium chloride in an alcohol such as either isopropanol or butanol, all combined with or with out small additions of hydrochloric acid, with n-butanol being preferred.

Such coating composition will contain sufficient ruthenium constituent to provide at least about 5 mole percent, up to about 50 mole percent of ruthenium metal, basis 100 mole percent of the metal content of the coating, with a preferred range being from about 15 mole percent to up to about 35 mole percent of ruthenium. It will be understood that the constituents are substantially present as their oxides, and the reference to the metals is for convenience, particularly when referring to proportions.

Such coating composition will contain sufficient Ir constituent to provide at least about 50 mole percent up to about 95 mole percent iridium metal, basis 100 mole percent of iridium and ruthenium metals, with a preferred range being from about 50 mole percent up to about 75 mole percent iridium. For best coating characteristics, then, the molar ratio of Ru:Ir will be from about 1:1 to about 1:4 with a preferred ratio being about 1:1.6.

A valve metal component may optionally be included in the coating composition in order to further stabilize the coating and/or alter the anode efficiency Various valve metals can be utilized including titanium, tantalum, niobium, zirconium, hafnium, vanadium, molybdenum, and tungsten. The valve metal component can be formed from a valve metal alchoxide in an alcohol solvent, with or without the presence of an acid. Such valve metal alchoxides which are contemplated for use in the present invention include methoxides, ethoxides, isopropoxides and butoxides. For example, titanium ethoxide, titanium propoxide, titanium butoxide, tantalum ethoxide, tantalum isopropoxide or tantalum butoxide may be useful. Additionally, salts of the dissolved metals may be utilized, and suitable inorganic substituents can include chlorides, iodides, bromides, sulfates, borates, carbonates, acetates, and citrates, e.g., $TiCl_3$ $TiCl_4$ or $TaCl_5$, in acid or alcohol solutions.

When the valve metal component is present, the coating composition will contain from about 0.1 mole percent up to not greater than 25 mole percent basis 100 mole percent of the metal content of the coating, with the preferred composition containing from about 5 mole percent up to about 15 mole percent.

It is contemplated that any of the multiple coating layers utilized herein will be applied by any of those means which are useful for applying a liquid coating composition to a metal substrate. Such methods include dip spin and dip drain techniques, brush application, roller coating and spray application such as electrostatic spray. Moreover, spray application and combination techniques, e.g., dip drain with spray application can be utilized. With the above-mentioned coating compositions for providing an electrochemically active coating, a roller coating operation can be most serviceable.

Regardless of the method of application of the coating, conventionally, a coating procedure is repeated to provide a uniform, more elevated coating weight than achieved by just one coating. However, the amount of coating applied will be sufficient to provide in the range of from about 0.05 $g/m^2$ (gram per square meter) to about 3.0 $g/m^2$, and preferably, from about 0.2 $g/m^2$ to about 1.0 $g/m^2$ based on iridium content, as metal, per side of the electrode base.

Following application of the coating, the applied composition will be heated to prepare the resulting mixed oxide coating by thermal decomposition of the precursors present in the coating composition. This prepares the mixed oxide coating containing the mixed oxides in the molar proportions, basis the metals of the oxides, as above discussed. Such heating for the thermal decomposition will be conducted at a temperature of at least about 350° C. for a time of at least about 3 minutes. More typically, the applied coating will be heated at a more elevated temperature of up to about 550° C. for a time of not more than about 20 minutes. Suitable conditions can include heating in air or oxygen. In general, the heating technique employed can be any of those that may be used for curing a coating on a metal substrate. Thus, oven coating, including conveyor ovens may be utilized. Moreover, infrared cure techniques can be useful. Following such heating, and before additional coating as where an additional application of the coating composition will be applied, the heated and coated substrate will usually be permitted to cool to at least substantially ambient temperature. Particularly after all applications of the coating composition are completed, postbaking can be employed. Typical postbake conditions for coatings can include temperatures of from about 400° C. up to about 550° C. Baking times may vary from about 10 minutes, up to as long as about 300 minutes.

A top coating layer, e.g., of a valve metal oxide, or tin oxide, or mixtures thereof, may be utilized for preparing an anode for resistance to agents (e.g. organic additives) in the electrolyte. The topcoats may also be used to decrease the rate of oxidation of minor species in solutions. The top coating layer will typically be formed from the salt of a dissolved metal, e.g., $TaCl_5$ in butanol. Where titanium oxide will be utilized, it is contemplated that such substituent may be used with doping agents.

Where tin oxide is the desired top coating layer, suitable precursor substituents can include $SnCl_4$, $SnSO_4$, or other inorganic tin salts. The tin oxide may be used with doping agents. For example an antimony salt may be used to provide an antimony doping agent. Other doping agents include ruthenium, iridium, platinum, rhodium and palladium, as well as mixtures of any of the doping agents.

Where a top coating layer is utilized, following application of such top coating, it may be desirable to postbake the coating layers, e.g., in a manner as discussed hereabove.

As has been discussed hereinbefore, the coating of the present invention is particularly serviceable for an anode in an electrolytic process for the manufacture of chlorine and alkali metal hydroxides. However, it is also contemplated that these electrodes may find use in other processes, such as the manufacture of chlorates and hypochlorites. It is also contemplated to utilize the coating of the present invention in various processes involving low current density oxygen evolution, including electrowinning, a process involving the production of printed circuit boards, processes for carrying out organic oxidations and reductions and for cathodic protection. The electrodes of the invention may be used for the electrolysis of lithium, sodium and potassium chlorides, bromides and iodides and more generally for the electrolysis of halogenides, for the electrolysis of other salts which undergo decomposition under electrolysis conditions, for the electrolysis of HCl solutions and for the electrolysis of water. They generally may be used for other purposes such as electrolytic oxidation or reduction of dissolved species, e.g. oxidation of ferrous ion to ferric ion.

EXAMPLE 1

A flat, titanium plate with punched holes of unalloyed grade 1 titanium, measuring approximately 0.025 inch thick and approximately 10×10 cm was grit blasted using alumina to achieve a roughened surface. The sample was then etched in a 90-95° C. solution of 18-20% hydrochloric acid for 25 minutes.

Coating compositions as set forth in Table 1 were applied to four separate samples. Coating solutions A-E were prepared by adding the amount of metals, as chloride salts, as listed in Table 1, to a solution of 19.2 ml of n-butanol and 0.8 ml concentrated HCl. Coating solution F was prepared by adding the amount of Ru and Ir, as chlorides, and the Ti, as titanium butoxide, as listed in Table I, to a solution of 5.3 ml BuOH and 0.3 ml HCl. After mixing to dissolve all of the salts, the solutions were applied to individual samples of prepared titanium plates. The coatings were applied in layers, with each coat being applied separately and allowed to dry at 110° C. for 3 minutes, followed by heating in air to 480° C. for 7 minutes. A total of 3 coats were applied to each sample. Samples A-C are in accordance with the present invention. Samples D-F are considered comparative examples.

TABLE I

| Sample | Amounts of Metal (g) | | | Composition (Mole %) | | |
| --- | --- | --- | --- | --- | --- | --- |
| | Ru | Ir | Ta | Ru | Ir | Ta |
| A | 0.105 | 0.2 | | 50 | 50 | |
| B | 0.067 | 0.201 | 0.0345 | 35 | 55 | 10 |
| C | 0.067 | 0.83 | 0.304 | 10 | 65 | 25 |
| D | 0.245 | 0.20 | | 70 | 30 | |
| E | 1.26 | | 2.26 | 50 | | 50 |
| | Ru | Ir | Ti | Ru | Ir | Ti |
| F | 0.17 | 0.17 | 0.359 | 17 | 9 | 75 |

The set of samples, A-F, were then operated as anodes in an accelerated test as an oxygen-evolving anode at a current density of 10 kA/m2 in an electrochemical cell containing 150 g/l $H_2SO_4$ at 50° C. Cell voltage versus time data was collected every 30 minutes. The results are summarized in Table II as the elapsed time before a given voltage rise.

TABLE II

| Sample | Composition (mole %) | | | | Lifetime (hrs/g/m$^2$) (Basis Ru + Ir) |
| --- | --- | --- | --- | --- | --- |
| | Ru | Ir | Ta | Ti | |
| A | 50 | 50 | | | 398 |
| B | 35 | 55 | 10 | | 346 |
| C | 10 | 65 | 25 | | 239 |
| D | 70 | 30 | | | 48 |
| E | 50 | | 50 | | 1.2 |
| F | 17 | 9 | | 75 | 19 |

It is, therefore, evident from the results of Table II that samples prepared according to the present invention have substantially increased lifetime versus the comparison examples evidenced by the extended time before a significant rise in voltage (>1 volt) occurs.

EXAMPLE 2

An anode of approximately 1.5 m$^2$ for a commercial chlorine membrane cell was prepared and coated with a solution comprised of Ru:Ir:Ta in mole ratio of 35:55:10 using chloride salts in n-butanol with 13.3 ml HCl per liter of solution. Total metal concentration (Ru+Ir+Ta) was 15 gpl. This solution was applied in 10 layers with each layer being dried at ca. 110-150° C. then heated to 480° C. for 7 minutes. A section of the anode was cut with a projected mesh area of 12.7×12.7 cm and installed in a lab membrane chlorine cell. The unit was operated at up to 8 kA/m2 for 295 days. The loss of Ru and Ir was less than 15%. In comparison, a coating comprised of Ru:Ir:Ti at 15:10:75 mole % (similar to Sample E in Example 1) was applied to a lab membrane cell anode and operated in a similar manner. After 269 days on line the loss of Ru and Ir was over 30%. In terms of usage of precious metal, the coating of this invention (35:55:10 Ru:Ir:Ta) had an average wear rate of 0.0015 grams of precious metal per metric ton of chlorine produced. The comparison sample, (15:10:75, Ru:Ir:Ti) had a wear rate of 0.016 grams of PM per ton of $Cl_2$, or a factor of 10 higher than the coating of the invention.

While in accordance with the patent statutes the best mode and preferred embodiment have been set forth, the scope of the invention is not limited thereto, but rather by the scope of the attached claims.

What is claimed is:

1. A process for the production of an electrolytic electrode having an electrocatalytic coating thereon, said electrocatalytic coating having reduced amounts of platinum group metal oxides while maintaining coating durability, said process comprising the steps of:

providing a valve metal electrode base;

coating said valve metal electrode base with a coating layer of an electrochemically active coating on said valve metal electrode base, said coating comprising a uniform mixture of platinum group metal oxides, and optionally, a valve metal oxide in an amount not greater than 25 mole percent, basis 100 mole percent of the metal content of the coating, said mixture of platinum group metal oxides consisting essentially of ruthenium oxide and iridium oxide in a proportion providing from at least about 5 mole percent up to about 50 mole percent ruthenium, and at least about 50 mole percent up to about 95 mole percent iridium, basis 100 mole percent of these metals present in the coating; wherein said ruthenium oxide and iridium oxide are present in a molar proportion of from about 1:1 to about 1:4 and wherein said electrochemically active coating is applied in an amount from about 0.2 g/m² to about 1.0 g/m², basis said iridium, as metal, per a side of said electrode base.

2. A process according to claim 1, wherein said valve metal electrode base is a valve metal mesh, sheet, blade, tube, punched plate or wire member or particles of titanium, including sintered particles.

3. A process according to claim 1, wherein said valve metal electrode base is one or more of titanium, tantalum, aluminum, hafnium, niobium, zirconium, molybdenum or tungsten, their alloys and intermetallic mixtures thereof.

4. A process according to claim 3, wherein a surface of said valve metal electrode base is a roughened surface.

5. A process according to claim 4, wherein said surface is prepared as by one or more of intergranular etching, grit blasting, or thermal spraying.

6. A process according to claim 4, wherein there is established a ceramic oxide barrier layer as a pretreatment layer on said roughened surface.

7. A process according to claim 5, wherein said ruthenium oxide and iridium oxide are present in a proportion providing from about 15 mole percent up to about 35 mole percent ruthenium, and from about 50 mole percent up to about 75 mole percent iridium, basis 100 mole percent of these metals present in the coating.

8. A process according to claim 1, wherein said electrocatalytic coating includes said valve metal oxide.

9. A process according to claim 8, wherein said valve metal oxide is one or more of titanium oxide, tantalum oxide, zirconium oxide, niobium oxide, hafnium oxide, tin oxide and said valve metal oxide is present in an amount of about 0.1 mole percent to about 25 mole percent.

10. A process according to claim 8, wherein there is established on said electrocatalytic coating at least one top coating layer containing a valve metal oxide coating or a tin oxide coating, or mixtures thereof.

11. The electrode of claim 10, wherein said top coating layer of valve metal oxide comprises an oxide selected from the group consisting of titanium, tantalum, niobium, zirconium, molybdenum, aluminum, hafnium, or tungsten.

12. A process according to claim 10, wherein said top coating layer is a tin oxide coating layer doped with one or more of Sb, F, Cl, Mo, W, Ta, Ru, Ir, Pt, Rh, Pd, or In and oxides thereof, and said doping agent is in an amount in the range of from about 0.1% to about 20%.

13. A process according to claim 1, wherein said coating is applied by one or more of dip spin, dip drain, brush, roller coating or spray application.

14. A process according to claim 1, further comprising heating said electrochemically active coating at a temperature of at least about 350° C. up to about 550° C. for a time of at least about 3 minutes up to about 20 minutes.

15. A process according to claim 1, wherein said electrolytic electrode is an oxygen-evolving electrode.

16. A process according to claim 1, wherein said electrode is an anode in an electrolytic cell utilized for electrowinning of a metal, copper foil deposition, electrolysis of halogenides, electrolysis of water, electrolysis of chlorides to produce chlorates or hypochlorites, or for cathodic protection.

17. A process according to claim 1, wherein said electrolytic electrode is an anode in a separated electrolytic cell.

18. A process according to claim 1, wherein said electrode is an anode in an electrolytic cell utilized for the oxidation or reduction of a soluble species.

19. An electrode for use in the electrolysis of a chlor-alkali solution, said electrode having an electrocatalytic coating thereon with said coating having reduced amounts of platinum group metal oxides while maintaining coating durability, said electrode comprising:
a valve metal electrode base;
a coating layer of an electrochemically active coating on said valve metal electrode base, said coating comprising a uniform mixture of platinum group metal oxides, and optionally, a valve metal oxide in an amount not greater than 25 mole percent, basis 100 mole percent of the metal content of the coating, said mixture of platinum group metal oxides consisting essentially of ruthenium oxide and iridium oxide in a proportion providing from at least about 5 mole percent up to about 50 mole percent ruthenium, and at least about 50 mole percent up to about 95 mole percent iridium, basis 100 mole percent of these metals present in the coating, wherein said ruthenium oxide and iridium oxide are present in a molar proportion of from about 1:1 to about 1:4 and wherein said electrochemically active coating is applied in an amount from about 0.2 g/m² to about 1.0 g/m², basis said iridium, as metal, per a side of said electrode base.

20. An electrode according to claim 19, wherein said valve metal electrode base is a valve metal mesh, sheet, blade, tube, punched plate or wire member.

21. An electrode according to claim 20, wherein said valve metal electrode base is one or more of titanium, tantalum, aluminum, hafnium, niobium, zirconium, molybdenum or tungsten, their alloys and intermetallic mixtures thereof.

22. An electrode according to claim 21, wherein a surface of said valve metal electrode base is a roughened surface.

23. An electrode according to claim 22, wherein said surface is prepared as by one or more of intergranlular etching, grit blasting, or thermal spraying.

24. An electrode according to claim 22, wherein there is established a ceramic oxide barrier layer as a pretreatment layer on said roughened surface.

25. An electrode according to claim 21, wherein said electrocatalytic coating includes said valve metal oxide.

26. An electrode according to claim 25, wherein said valve metal oxide is one or more of titanium oxide, tantalum oxide, zirconium oxide, niobium oxide, hafnium oxide, or tin oxide and said valve metal oxide is present in an amount of about 0.1 mole percent to about 25 mole percent.

27. An electrode according to claim 21, wherein there is established on said electrocatalytic coating at least one top coating layer containing a valve metal oxide coating or a tin oxide coating, or mixtures thereof.

28. An electrode of claim 27, wherein said top coating layer of valve metal oxide comprises an oxide selected from the group consisting of titanium, tantalum, niobium, zirconium, molybdenum, aluminum, hafnium, or tungsten.

29. An electrode according to claim 27, wherein said top coating layer is a tin oxide coating layer doped with one or more of Sb, F, Cl, Mo, W, Ta, Ru, Ir, Pt, Rh, Pd, or In and oxides thereof, and said doping agent is in an amount in the range of from about 0.1% to about 20%.

30. A process for the electrolysis of an aqueous chlor-alkali solution in an electrolytic cell having at least one anode therein, said anode having an electrocatalytic coating containing reduced amounts of platinum group metal oxides while maintaining coating durability, said process comprising the steps of:

provided a separated electrolytic cell having a separator therein;

establishing in said cell an electrolyte;

providing said anode in said cell in contact with said electrolyte, said anode having said electrocatalytic coating comprising a uniform mixture of platinum group metal oxides, and optionally, a valve metal oxide in an amount not greater than 25 mole percent, basis 100 mole percent of the metal content of the coating, said mixture of platinum group metal oxides consisting essentially of ruthenium oxide and iridium oxide, in a proportion providing from at least about 5 mole percent up to about 50 mole percent ruthenium, and at least about 50 mole percent up to about 95 mole percent iridium, basis 100 mole percent of these metals present in the coating; wherein said ruthenium oxide and iridium oxide are present in a molar proportion of from about 1:1 to about 1:4 and applying said electrochemically active coating in an amount from about 0.2 $g/m^2$ to about 1.0 $g/m^2$, basis said iridium, as metal, per a side of said electrode base;

impressing an electric current on said anode; and evolving chlorine at said anode.

31. A process according to claim 30, wherein said electrolyte in said cell is one or more of sodium chloride, potassium chloride or lithium chloride.

32. A process according to claim 30, wherein said electrocatalytic coating includes said valve metal oxide, and said valve metal oxide is one or more of titanium oxide, tantalum oxide, zirconium oxide, niobium oxide, hafnium oxide, or tungsten oxide.

33. A process according to claim 32, wherein said valve metal oxide is present in an amount of from about 0.1 mole percent up to about 25 mole percent.

34. A process according to claim 32, wherein there is established on said electrocatalytic coating at least one top coating layer containing a valve metal oxide coating or a tin oxide coating, or mixtures thereof.

35. A process of claim 34, wherein said top coating layer of valve metal oxide comprises an oxide selected from the group consisting of titanium, tantalum, niobium, zirconium, molybdenum, aluminum, hafnium, or tungsten.

36. A process according to claim 34, wherein said top coating layer is a tin oxide coating layer doped with one or more of Sb, F, Cl, Mo, W, Ta, Ru, Ir, Pt, Rh, Pd, or In and oxides thereof, and said doping agent is in an amount in the range of from about 0.1% to about 20%.

37. A process according to claim 30, wherein a surface of said anode is a roughened surface prepared by one or more steps of intergranular etching, grit blasting, or thermal spraying.

38. The process of claim 37 wherein said anode surface comprises titanium and said electrocatalytic coating is provided on said titanium member by a procedure including electrostatic spray application, brush application, roller coating, dip application and combinations thereof.

39. A process according to claim 30, wherein said cell is separated by a membrane separator or a porous separator, including a diaphragm.

* * * * *